Figures 1, 2:
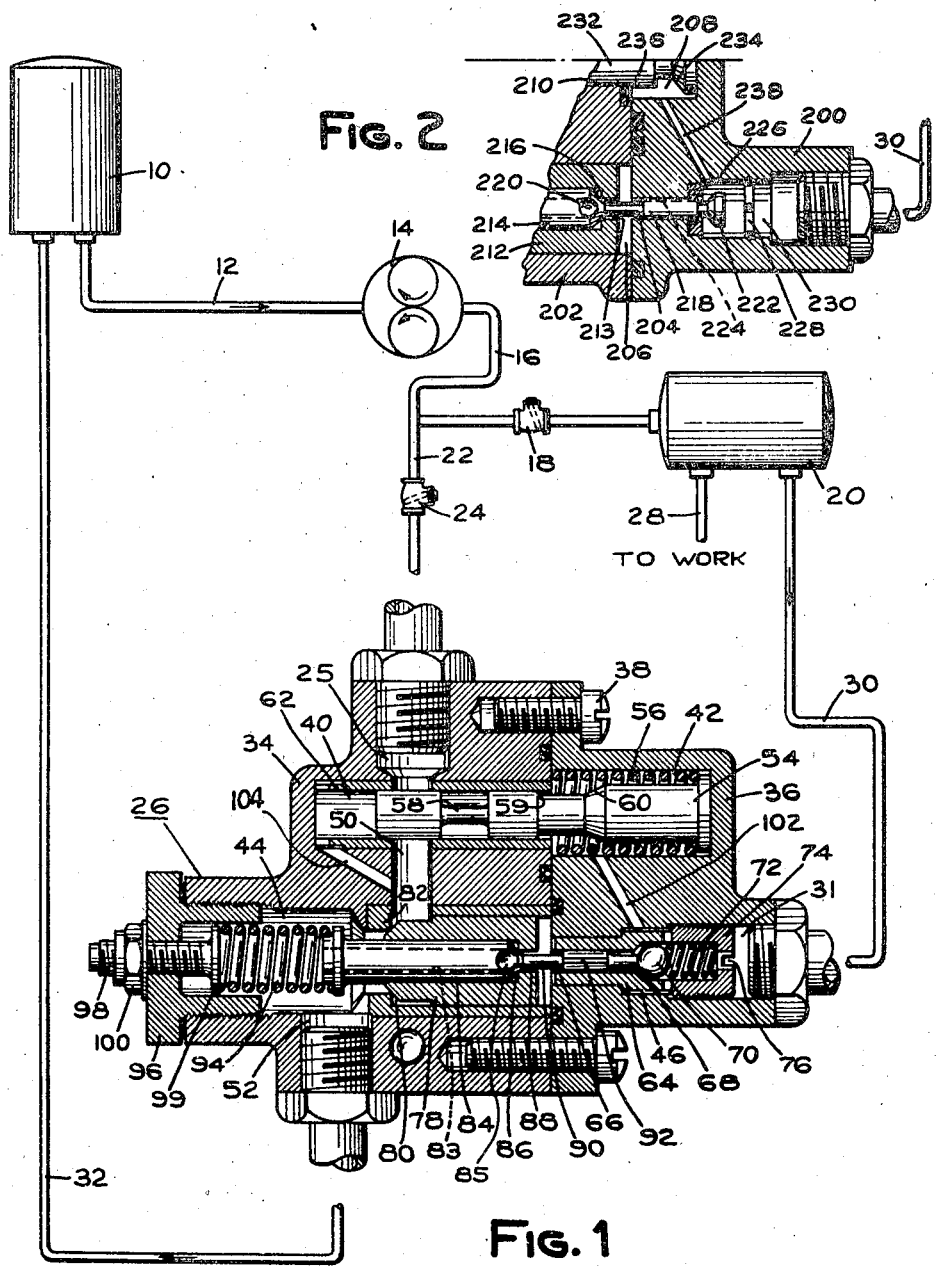

Nov. 5, 1946. H. B. SCHULTZ 2,410,751
PRESSURE ACTUATED VALVE
Filed June 3, 1942

INVENTOR
HAROLD B. SCHULTZ
BY
A. R. McCrady
ATTORNEY

Patented Nov. 5, 1946

2,410,751

UNITED STATES PATENT OFFICE 2,410,751

PRESSURE ACTUATED VALVE

Harold B. Schultz, South Bend, Ind., assignor to Bendix Aviation Corporation, South Bend, Ind., a corporation of Delaware Application June 3, 1942, Serial No. 445,629

2 Claims. (Cl. 137—153)

This invention relates generally to accumulator systems for aircraft and particularly to improvements in regulating or unloading valves therefor. In modern aircraft which employ accumulators for maintaining fluid under pressure for operating various mechanisms such as landing gears and wing flaps it is desirable that the pressure in such a system be kept within rather definite limits, for example, between 800 and 1000 pounds per square inch. In such systems, it is not feasible to start and stop a pump to maintain the desired pressures, since such pumps may be operated by some sort of power take-off from an airplane engine, and since it is not feasible to maintain extra control means for connecting and disconnecting the pump from the power take-off.

It is generally desirable to operate such an accumulator by having the pump operate constantly, and to provide means for unloading the pump back into the reservoir. Such a system insures that the pump is operating against very small head when the accumulator in the system has attained a desired pressure, so that power loss and pump wear are reduced to a minimum.

It is an object of this invention to provide a regulator or unloading valve in such a system which will operate within close limits, insuring that the accumulator system is maintained within a close range of pressures.

Another object of this invention is to provide such a valve which, when in the open position, will have very little resistance to fluid flow, so that the head against which the pump must operate is kept to a minimum.

Still another object is to provide such a valve for an accumulator system which will make it unnecessary to keep within close limits the concentricity or alignment of various of the valve elements.

A still further object is to provide a regulator or unloading valve for such a system which will be light in weight and simple to manufacture.

Still further objects and desirable features will be apparent from a study of the description which follows, in which:

Figure 1 shows an accumulator system for aircraft having therein a valve according to the present invention, the valve being shown in longitudinal section, certain parts thereof being shown in elevation; and Figure 2 shows an alternate embodiment of the valve made according to the present invention, only that portion which differs from the preferred embodiment shown in Figure 1 being shown.

The accumulator system of Figure 1 comprises a reservoir 10 connected by a conduit 12 to a pump 14 which delivers fluid under pressure through conduits 16 past a check valve 18 to an accumulator 20. A conduit 22 branches from conduit 16 and fluid is supplied by the pump 14 through the conduit 22 and past a check valve 24 to a port 25 of a regulator valve 26 which comprises a part of this invention.

Accumulator 20 is connected to various hydraulically operated devices through a conduit 28 and is connected also to another port 31 of the valve 26 through a conduit 30. A conduit 32 connects the valve 26 to the reservoir 10.

The operating parts of the valve 26 are housed within a body made up of two parts, body members 34 and 36 which are held together by means of cap screws 38 or the like. A bore 40 in body member 34 is coaxial with a bore 42 in the body member 36 and parallel thereto and spaced therefrom is a bore 44 in member 34 coaxial with a bore 46 in member 36.

A bore 50 intersects bore 40 and bore 44, and communicates port 25 with bores 40 and 44. Conduit 32 is open to the bore 44 at port 52.

Within the bore 40 is a valve member 54 which also extends into bore 42, and which is normally biased to the right by a spring 56. The valve member 54 is reduced as at 58, is shouldered as at 59, and has a tapered face 60. When valve 54 is urged to the left, as will be explained later, it forms a seal with a liner 62 within the bore 40. At such times the reduced portion 58 of the valve 54 will intersect the bore 50. A passage 104 communicates one end of the bore 40 with the bore 50.

Within bore 46 is a liner 64 having a bore 66 which is tapered at 68 to form a seat for a ball 70. Ball 70 is urged to the left by a spring 72 which is retained by a slotted and threaded member 74 which has an axial opening 76 therein to permit flow of fluid. A passage 102 communicates bore 46 with bore 42.

Within the bore 44 is a plunger 78 having a conical face 80 which is seated on a liner 82. The plunger 78 is fitted with a hollow valve member 84 having a tapered face 86 which is seated at an orifice 88 in the plunger 78. The hollow valve member 84 engages an extended shank 90 of a fluted member 92 positioned between the ball 70 and the hollow valve member 84. The hollow valve member 84 is drilled as at 85 to intersect a bore 83 in the valve member 84, and is normally urged to the right by a spring 94. Spring 94 is enclosed within the bore 44 by a hollow cap bolt 96, and is load-adjusted by means of a threaded member having a head 99 bearing against the spring 94. Member 98 is threaded in the cap bolt 96, and is locked into position by a nut 100.

An alternate embodiment of the valve 26 of Figure 1 is shown in Figure 2. Essentially, the valve of Figure 2 differs only from the valve of Figure 1 in that the ball valve 70 is replaced by a poppet-type valve.

The regulating or unloading valve of Figure 2 has its operating parts contained within two body members 200 and 202 which are secured together by any suitable means, which are not shown. Within member 200 is a bore 204 which is coaxial with a bore 206 in member 202. Another bore 208 in body member 200 is coaxial with a bore 210 in body member 202. Each pair of coaxial bores may be parallel to and spaced from the other pair of coaxial bores in the manner shown.

Within bore 206 is a hollow plunger 212, having therein a hollow cylindrical valve member 214 which has a tapered portion 216 extending into an orifice 213 in plunger 212. Hollow valve member 214 is drilled as at 220 to intersect the tapered portion 216 and to connect the interior of the member 214 with the opening 213 and the bore 206.

A poppet 222 has a stem 218 which is slotted as at 224, and which slides freely in the bore 204, and is seated on valve seat 226. The movement of poppet 222 to the right is restricted by a keeper 228 inserted in the port 230 which is connected to the accumulator 20 through conduit 30.

Bores 208 and 210 contain a valve member 232 which is slidable in bore 210 and which has a face 234 which may be seated upon a seat 236 in the housing 202. The construction shown is the equivalent of members 54 shown in Figure 1, the valve 232 being urged to the right by a spring which is not shown. A passage 238 connects bore 208 with port 230.

The operation of the system shown in Figure 1 is as follows. Assuming that there is no residual pressure in the accumulator 20, valve member 54 will be normally biased to the right as shown in Figure 1 to prevent passage of the fluid through the regulator valve 26 until the pressure in the accumulator 20 is sufficient to force the plunger 78 to its seat at 82 to start the normal operating cycle. With plunger 78 seated, the pressure continues to build up in the port 31, the bore 66, and the chamber formed behind the plunger 78. With the plunger 78 seated the pressure from the accumulator 20 continues to build up until it is sufficient to unseat the hollow valve 84 against its spring 94. When the pressure from the accumulator 20 in the chamber behind plunger 78 reaches a point where the force caused by the pressure, acting on the portion of valve member 84 within orifice 88, exceeds the opposing force of spring 94, the valve 84 will crack open enough to bleed the excess of pressure. But the quantity of fluid bled through orifice 88 and opening 85, and which also must pass fluted member 92, is much less than the output from pump 14, which continues to build up the pressure in the accumulator 20.

Since the valve member 84 bleeds at a constant predetermined pressure, and since the pressure at port 31 and in bore 46 is higher than this predetermined pressure, there is a differential pressure across fluted member 92 which forces fluted member 92 and in turn valve member 84 to the left. This action further decreases the pressure behind plunger 78 and in turn increases the differential pressure across member 92, causing ball 70 to snap to its seat 68 in liner 64.

The pressure in the chamber behind the plunger 78 will now be dissipated through the opening 85 until it is equal to the pressure in the reservoir 10. The pressure in the bore 46 will now be communicated through the passage 102 to the bore 42 where it acts over the area of bore 40 on valve member 54, tending to force valve member 54 to the left. As soon as member 54 moves to the left to a point where the constricted portion 58 lies across bore 50, fluid under pressure from pump 14 will be admitted to bore 50, passage 104, and bore 40. Valve member 54 will move to the left until the force caused by any pressure in bore 50, passage 104, and the chamber behind valve member 54 in body member 34 plus the force of spring 56 balances the opposing force of accumulator pressure in bore 42 against valve member 54.

The resultant pressure in bore 50 acting on face 80 of plunger 78, being opposed only by reservoir pressure in the chamber behind plunger 78, will cause the plunger 78 to be unseated, relieving pressure in bore 50 to reservoir 10, and causing face 60 of valve member 54 to snap to its seat on liner 62. The fluid, which is now bypassed from pump 14, takes a path past the narrow portion 58 of the valve member 54 through bore 50, past unseated plunger 78 out the port 52, and into the reservoir 10. Thus the pump 14 is operating under no load except for very small head losses of the system.

However, when the hydraulic devices, which are operated by the fluid under pressure in the accumulator 20, are in use the pressure in the system may drop below a desired predetermined amount. At such time the valve 26 will close the pump 14 to the reservoir 10, and will cause the pump 14 to deliver fluid to the accumulator 20 from the reservoir 10. The operation of the valve 26 to cause the pump 14 to deliver fluid to the accumulator 20 is as follows.

When the pressure acting on the area of the seat 68 of ball 70, which is slightly larger than that of the seat of the valve member 84, exerts a force less than the load on spring 94, hollow valve member 84 closes on its seat in the orifice 88 and closes the chamber behind the plunger 78 to the pressure in reservoir 10, and connects it to the pressure in the accumulator 20. The pressure in the chamber behind plunger 78 will then force plunger 78 to the left against its seat on liner 82, and thus prevent the flow of fluid to the reservoir 10.

The operation just described assumed that there was no residual pressure in the accumulator 20. It will be apparent, therefore, that the function of valve member 54 is to make the regulator valve 26 entirely automatic regardless of the pressure in the accumulator 20, and without depending upon a low by-pass pressure to achieve operation as has been the usual case with valves now known in the art, which have been dependent upon a pressure drop in the valve by building up pressure to oppose a spring-biased plunger.

Once the system of Figure 1 is in operation, and the accumulator 20 maintains some pressure which exceeds a value which is a function of the loads on springs 56 and 94, and of the seat areas of members 54 and 84, the valve member 54 no longer controls the movement of the other valve members. The position of valve member 54 will then be dependent upon the pressures acting against it through passages 102 and 104, and also upon the load in spring 56. Thus it will be seen that once operation of the system is begun, the valve 26 will be in the open or closed position depending upon the pressure in accumulator 20, and when in the open position there will be no pressure drop through the valve 26, since the by-passing pressure is unopposed by any spring-loaded controlling element.

When the accumulator pressure builds up to the point where the pressure behind plunger 78 exerts a force on the portion of valve member 84 within orifice 88 greater than the opposing force of spring 94, the cycle will be repeated.

The operation of the arrangement shown in Figure 2 is similar to that which has been described with reference to Figure 1. With the plunger 212 at the seated position like plunger 78 of Figure 1, pressure continues to build up in the chamber behind the plunger 212 until it is sufficient to crack the valve member 214 against its spring (not shown) which is like spring 94 shown in Figure 1. When the pressure from accumulator 20 in the chamber behind plunger 212 reaches a point where the force caused by the pressure, acting on the portion of valve member 214 within orifice 213, exceeds the opposing force of a spring corresponding to spring 94 of Figure 1, the valve member 214 will crack open enough to bleed the excess of pressure through the opening 220. But the quantity of fluid bled through orifice 213 and opening 220, and which must also pass the slot 224, is much less than the output from pump 14, which continues to build up the pressure in accumulator 20. Since the valve member 214 bleeds at a constant predetermined pressure, and since the pressure in bore 230 is higher than this predetermined pressure, there is a differential pressure across the stem 218 of the poppet 222 which forces the valve member 214 further to unseat it. This action further decreases the pressure behind plunger 212 and in turn increase the differential pressure across the stem 218 causing the poppet 222 to snap against its seat 226. Pressure will then be transmitted through the passage 238 into the bore 208, and will force the valve member 232 to the left, in turn moving plunger 212 to the right as was described with reference to the embodiment shown in Figure 1.

The arrangement of parts will be like that shown in Figure 1 except that a constricted portion of valve member 232, like portion 58 of valve member 54, will lie across the bore 50.

When hydraulic devices are used the pressure in the system drops. When the pressure acting on the seat 226 of poppet 222 (slightly larger than that of the seat of hollow valve member 214) exerts a force less than the opposing force of the spring (like spring 94 of Figure 1) tending to urge valve member 214 to the right, valve member 214 will close off the chamber behind plunger 212 to reservoir pressure and connect it to accumulator pressure in conduit 30. At the same time the pressure has dropped in the accumulator 20 there will be a balance of pressure on the valve member 232 and it will be urged to the right by its spring. The cycle will then be repeated when the pressure in the accumulator reaches a value whereby the regulator valve will unload the pump 14 directly into the reservoir 10.

Although there has been described a novel regulator and unloading valve which may be used in an accumulator system, it is not intended that this invention be limited to the application disclosed, nor is it limited to the kind of system shown. It is obvious to those skilled in the art that the invention could be applied to any system whereby a fluid is kept within close pressure limits. While this invention has been described with reference to desirable embodiments thereof it is not to be construed that the invention is limited to the embodiment shown but only by the claims appended hereto.

I claim:

1. A regulator valve comprising an inlet, outlet and control ports, a passageway connecting the inlet port to the outlet port, a first valve normally spring-biased to close the passageway and responsive to a predetermined pressure in the control port to cause the valve to move to a position to open the passageway, a second valve in the passageway urged toward closed position by the pressure in the control port and toward open position by pressure in the passageway when the first valve is open, a valve seat in the second valve, means for controlling the control port pressure which tends to close the second valve comprising a third valve seated in the second valve and having an area subject to pressure from the control port for unseating the same, a transverse passage in the third valve adjacent the seat and disposed on the side thereof opposite from the area subject to control port pressure, a second passage in the third valve connecting the transverse passage to the outlet to release the pressure urging the second valve toward closed position when the third valve is unseated, whereby a differential pressure is created across the second valve.

2. A regulator valve comprising an inlet, outlet and control ports, a passageway connecting the inlet port to the outlet port, a first valve normally spring-biased to close the passageway and responsive to a predetermined pressure at the control port to cause the valve to move to a position to open the passageway, a second valve in the passageway urged toward closed position by the pressure in the control port and toward open position by pressure in the passageway when the first valve is open, an orifice in the second valve, a seat in the orifice, a third valve urged toward the seat by a spring and away from the seat by pressure from the control port acting through the orifice, a transverse passage in the third valve adjacent the seat and disposed on the side thereof opposite from that portion of the third valve subject to control port pressure, a second passage in the third valve connecting the transverse passage to the outlet, and means including a ball valve normally unseated by the third valve but constructed and arranged to seat when the latter unseats to cut off the pressure from the control port acting on the second valve, whereby a differential pressure is created across the second valve.

HAROLD B. SCHULTZ.